L. W. BUGBEE.
OPHTHALMIC MOUNTING.
APPLICATION FILED JAN. 2, 1918.
1,324,225.
Patented Dec. 9, 1919.
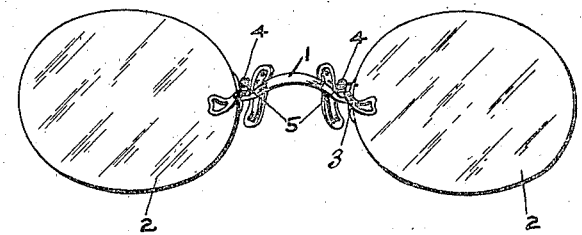
FIG. I
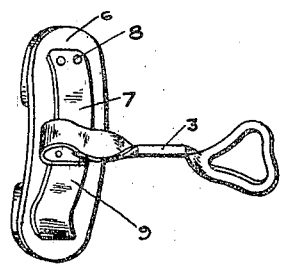
FIG. II
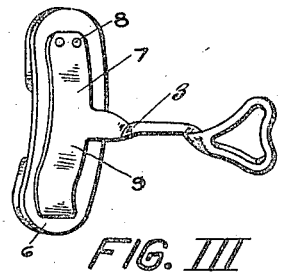
FIG. III
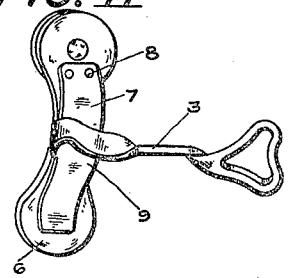
FIG. IV
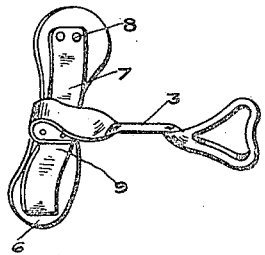
FIG. V
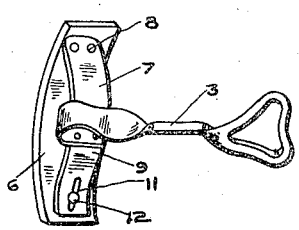
FIG. VI
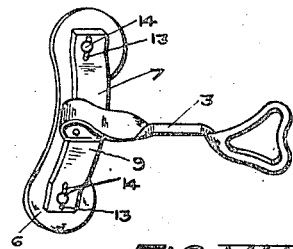
FIG. VII
INVENTOR
LUCIAN W. BUGBEE
BY
H. H. Styll & H. K. Parsons
ATTORNEYS

UNITED STATES PATENT OFFICE.

LUCIAN W. BUGBEE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,324,225.      Specification of Letters Patent.      Patented Dec. 9, 1919.

Application filed January 2, 1918. Serial No. 210,009.

*To all whom it may concern:*

Be it known that I, LUCIAN W. BUGBEE, a citizen of the United States, residing at Southbridge, in the county of Worcester and State of Massachusetts, have invented certain new and useful Improvements in Ophthalmic Mountings, of which the following is a specification.

This invention relates to new and useful improvements in ophthalmic mountings and more particularly to a nose guard, the main object of the present invention being the provision of a nose guard having means for yieldably supporting the same upon the mounting said means being so arranged that when the guard is applied to the nose, the pressure of the yieldable means will tend to impart a downward movement on the part of the guard thus simultaneously drawing the bridge down into close contact with the nose whereby the mounting will be securely applied to the nose.

Another object of the present invention is the provision of a nose guard wherein additional yieldable means is applied to the guard in connection with the usual spring arm in use upon ophthalmic mountings at the present time thus providing additional clamping means to the nose guard.

A still further object of the invention is the provision of a spring member adapted for application to the nose guard which can be readily attached to any well known form of guard with but very little alteration in the guard itself and can be either integrally formed with the guard arm or secured thereto in any suitable manner.

With the above and other objects in view the invention consists in the novel features of construction and the combination and arrangement of parts hereinafter more fully set forth, pointed out in the claims and shown in the accompanying drawings, in which—

Figure I is a front elevation of a pair of eye glasses embodying my improved guard.

Fig. II is a detailed perspective view of the guard and connecting arm.

Fig. III is a similar view illustrating a slightly modified form of the invention.

Fig. IV is another perspective view illustrating another form of guard.

Fig. V is a perspective view illustrating still another form.

Fig. VI is a detailed perspective view illustrating another form of guard.

Fig. VII is a perspective view illustrating another form of the guard.

Referring now more particularly to the drawings it will be noted that in Fig. I I have illustrated my improved guard in connection with a pair of nose glasses and in this view the numeral 1 indicates a nose bridge connecting the glasses with the lenses 2, and mounted upon the bridge adjacent the ends thereof are the guard arms 3 which are mounted for pivotal movement upon the pins 4, said pins having the usual springs 5 adapted for engagement with the guard arms to yieldably retain the nose guard in contact with the nose.

In Fig. II I have illustrated in perspective a nose guard generally indicated by the numeral 6 and attached to the rear of the guard is a curved spring member 7 one end of which is riveted or otherwise secured to the guard member as indicated at 8 while the other end thereof is curved outwardly as shown at 9 and adapted to loosely engage the guard member so that the end of the spring will readily move thereover. It will be noted that the inner end of the guard arm 3 is bent upon itself and its extreme end riveted or otherwise secured to the springs 7 at approximately the central portion thereof. Thus as the guard is applied to the nose, the pressure resulting from the spring 5 will tend to force the inner end of the arm 3 against the tension of the spring 7, the lower end of the spring moving downwardly over the surface of the back of the guard thus imparting a downward pull upon the guard which will tend to bring the nose bridge into close contact with the crown of the nose and insure a perfect fitting of the mounting when applied to the nose.

In Fig. III I have illustrated a modified form of the invention wherein the arm 3 and spring member 7 are integrally formed, it being understood that the operation of the invention is the same as the main form of the invention illustrated in Fig. II. It will also be noted that in Fig. IV I have illustrated another form of the invention wherein the inner end of the guard arm is extended over the spring member 7 and integrally connected to the opposite edge thereof from that shown in Fig. III. In Fig. V I have illustrated the invention as applied to another form of guard member, and it will be noted that this form of guard member is the form which is best known to the commercial trade.

In Fig. VI I have illustrated a slightly modified form of the invention wherein the lower end of the spring 7 is provided with a longitudinal slot 11, and extending outwardly from the lower end of the guard 6 is a headed pin 12 adapted to be disposed within the slot 11 so as to normally retain the end of the spring 7 in contact with the rear of the guard and thus prevent the same from being accidentally bent outwardly away from contact with the guard. It will be apparent, however, that the operation of this form of the invention is identical with the form illustrated in Fig. II with the exception that the movable end of the spring is at all times securely retained in contact with the guard.

In Fig. VII I have illustrated still another form of the invention wherein each end of the spring member 7 is provided with a longitudinal slot as indicated at 13 and extending outwardly from the guard are the headed pins 14 disposed within these slots to securely retain the ends of the spring member in contact with the guard. In this form of the invention I have illustrated the guard arm as integrally connected with the spring member and it will be apparent that when the mounting is applied to the face of the wearer, the pressure which is conveyed to the spring member 7 will tend to impart a movement to both ends of the spring so that the guard 6 will readily adapt itself to the surface of the nose to which the same is applied so that a close fitting of the mounting will be assured.

From the above description in connection with the accompanying drawings it will be readily apparent that I have provided a novel form of nose guard for eye glasses wherein the guard is provided with means connected with the guard arm that will tend to impart a downward pull on the mounting when the same is applied to the nose so as to bring the bridge in close contact with the nose and thus assure a close fitting of the mounting. From this it will be apparent that this spring member can be either integrally formed with the guard arm or connected thereto in any suitable manner. Furthermore, it will be apparent that the spring member 7 can be either rigidly or detachably connected with the guard.

I claim:

1. A guard for ophthalmic mountings, including an arm, a yieldable spring member connected at its intermediate portion to the arm, a guard member to which the spring is secured whereby pressure against the guard member will tend to place the pressure of the spring upon the ends of the guard member.

2. A device of the class described, including an arm, a yieldable spring member connected at its central portion with one end of the arm, a guard member secured to the spring in such a manner that the ends of the spring bear against the ends of the guard member whereby pressure against the guard member will equally distribute the tension of the spring upon the back of the guard member.

3. A device of the class described, including a pivoted arm, a guard member, a yieldable spring member attached to one end of the arm, said spring member having one of its ends connected to the back of the guard member adjacent one end thereof and its other end loosely engaged by the opposite end of the guard member whereby pressure against the ends of the guard member will yieldably distribute the tension of the spring upon the guard.

In testimony whereof I have affixed my signature in presence of two witnesses.

LUCIAN W. BUGBEE.

Witnesses:
   H. E. COLEMAN,
   A. S. CANN.